Jan. 11, 1955 P. W. HARLAND 2,699,542
SYNCHRO-TRANSFORMER SERVOMOTOR INDICATOR
Filed April 24, 1952 3 Sheets-Sheet 2
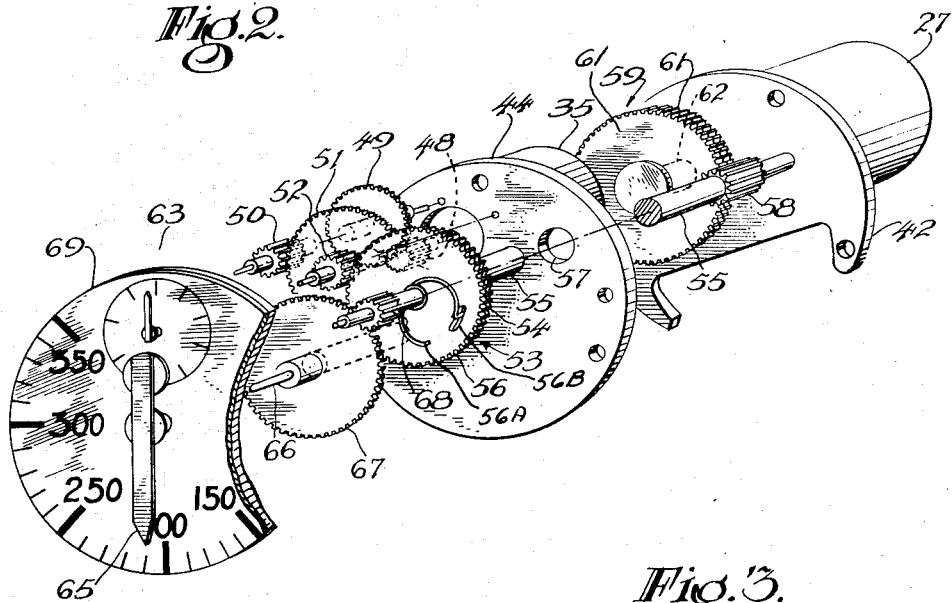
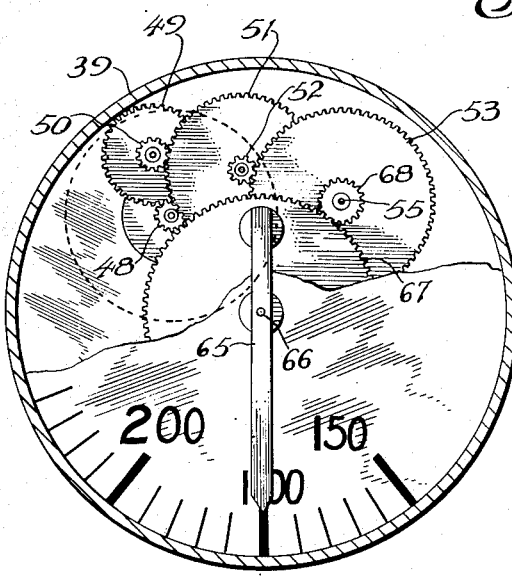
INVENTOR.
PHILIP W. HARLAND
BY
Pollard and Johnston
ATTORNEYS

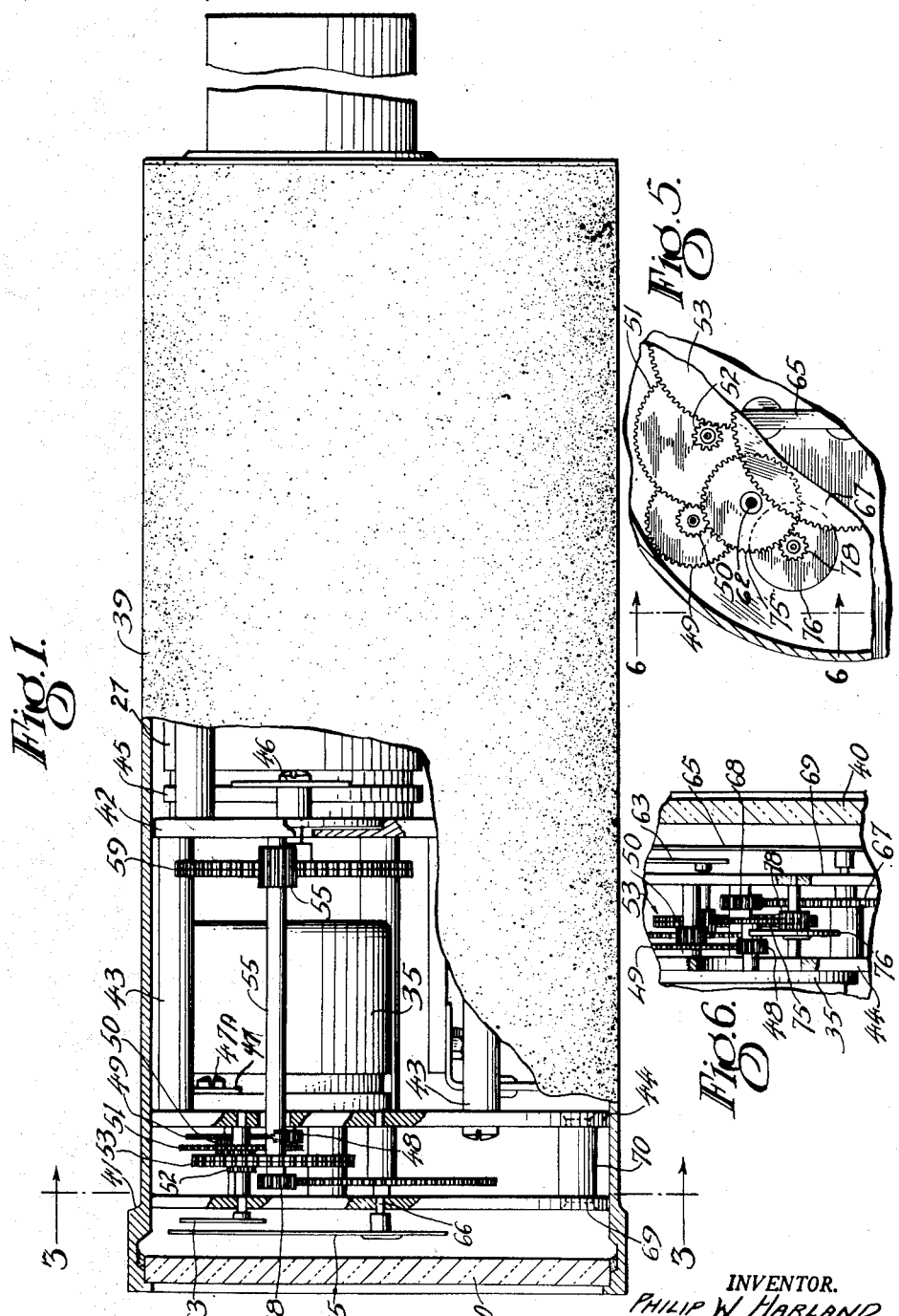

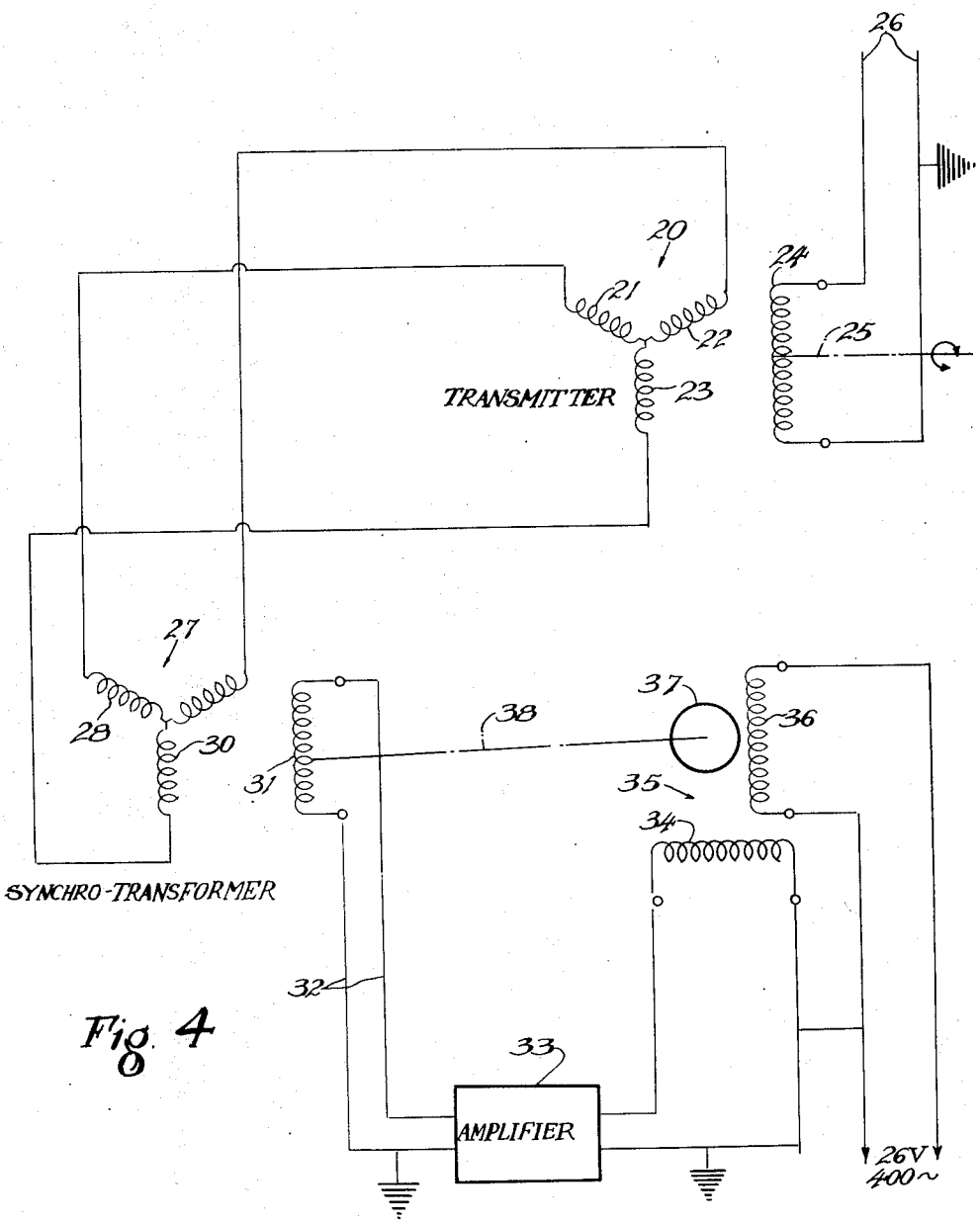

United States Patent Office 2,699,542
Patented Jan. 11, 1955

2,699,542

SYNCHRO-TRANSFORMER SERVOMOTOR INDICATOR

Philip W. Harland, Sellersville, Pa., assignor to American Machine and Metals, Inc., Sellersville, Pa., a corporation of Delaware Application April 24, 1952, Serial No. 284,186

13 Claims. (Cl. 340—378)

This invention relates to unitary electrically operated indicating servomechanism instruments and particularly to the gear connections in a unitary device.

Servomechanisms have been employed in conjunction with control and indicating instruments, the error signal being amplified for positioning a servo-motor. In previous servomechanism arrangements, such as those for indicating pressure and the like, the electronic amplifiers have been remotely located relative to the indicating instrument itself. The amplifiers have taken up considerable space and have required many wires for their connections to the instrument so that where numerous instruments have been needed, such as in an airplane, the number and weight of the connecting wires becomes a substantial and objectional factor. Also, the size and weight of previous instruments has militated against their use in many instances. One of the important requirements in an accurate instrument is that it be sensitive to small changes in the measured function and respond to these changes without hunting.

One of the objects of the invention is to provide a servomechanism indicating arrangement having gear train means providing high sensitivity to small changes in the quantity to be measured or indicated, and yet being adequately damped so as not to overshoot upon large deviations of the measured quantity.

The invention will be described in conjunction with a pressure indicating device but it is to be understood that it can be used for various purposes and is not limited thereto; but can be used in conjunction with positional following devices. For the specific example described, a suitable pressure operated means can be used to produce a signal turning the rotor of a conventional synchro-transmitter. The synchro-transmitter will produce a signal depending upon the relationship of the rotor to the stator windings, an alternating current being supplied to the rotor. A synchro-transformer can be connected to the three phase stator winding of the synchro-transmitter so that similar voltage and phase relationships will exist in the stator windings of the synchro-transformer. A signal will be produced in the rotor winding of the synchro-transformer as is known. This signal is called the "error" signal and it can be fed to a special amplifier circuit described in detail in copending application Serial No. 284,185, filed April 24, 1952.

The amplified signal can be connected to one of the phases of a two phase servo-motor, the other phase of the motor being connected to the aforementioned alternating current supply. The amplifier is arranged to produce a phase shift so that its output signal is displaced relative to the alternating current supply. The servo-motor is mechanically connected through a main gear train with the rotor of the synchro-transformer, this invention being particularly concerned with the mechanical connection and the related damping means.

The indicator may have a "fine" pointer interposed in the main gear train between the servo-motor and the synchro-transformer, and a single turn or "unit" pointer connected through an auxiliary gear train to the main gear train intermediate the servo-motor and synchro-transformer. The fine pointer indicates fractions of a revolution of the synchro-transformer and the unit pointer indicates the number of turns of the fine pointer.

In a preferred aspect, the main gear train is arranged so that there is substantially no back-lash or eccentricity therein between the synchro-transformer and the place where the auxiliary gear train is connected to the main gear train, the fit being such as is consistent with stable operation of the overall system. The auxiliary gear train itself and/or its connection to the main gear train preferably is fitted relatively loosely for the reasons which will appear hereafter. Also, the gear train between the servo-motor and the auxiliary gear train can be relatively loose so as to eliminate oscillatory movements through the gear train and to permit free movement of the servo-motor before engaging the gear train load.

When the synchro-transmitter changes the electrical relationships in the synchro-transformer because of change of position of its rotor due to a change in the function being indicated, the servo-motor will turn in response thereto, and the main gear train will be rotated appropriately to re-zero the synchro-transformer rotor. In this preferred form of the invention, at the start of rotation of the main gear train, the inertia of the relatively large auxiliary gear train, which is connected to the main gear train, will not be effective immediately because of the loose fit therebetween. Thus, small changes of pressure or condition will cause operation of the indicating arrangement without involving the inertia in the auxiliary gear train at the very beginning of the movement. However, when large changes or signals occur and the servo-motor is given a large impulse, it will tend to overshoot and thus a damping effect becomes desirable. In the arrangement described, the inertia of the unit pointer or auxiliary gear train will come into play immediately after the initial movement and thus serve to mechanically damp the movement. Additional inertia means also can be connected to the main gear train at or adjacent the servo-motor, the main gear train having relatively low inertia. Thus, the additional inertia means is available at the source of power to prevent undesirable oscillations.

Various types of amplifiers can be used, such being described in the aforementioned copending application Serial No. 284,185. In one arrangement, the phase shift in the amplifier is substantially constant regardless of signal strength, and the phase relationships are designed so that the torque of the servo-motor will be relatively high at small signal strengths. This may be accomplished by including an input transformer operating at maximum flux density and maximum permeability at small error signal input values, together with suitable capacitance in the primary circuit in series therewith. The secondary circuit can have a push-pull amplifier and suitable capacitors in the grid circuits of the amplifier tubes. The components are selected and arranged so that optimum phase shift conditions will exist at small signal strengths as well as with high signal strengths. The amplifier also can take other forms and have other characteristics.

These and other objects, advantages, and features of the invention will become apparent from the following description and drawings which are merely exemplary.

In the drawings:

Figure 1 is a view partially in section of one form of the instrument, the view being approximately twice the full size of an instrument made in accordance with the invention.

Figure 2 is a fragmentary exploded perspective view of the instrument showing the relationship of the gears and parts.

Figure 3 is a broken view taken generally along the line 3—3 of Figure 1, the upper portion being broken away.

Figure 4 is a schematic wiring diagram of one form of the combination including the synchro-transmitter.

Figure 5 is a fragmentary view looking in the same direction as Figure 3 of a modification showing an inertia means added to the main gear train.

Figure 6 is a fragmentary view looking in the direction 6—6 of Figure 5.

The instrument will be described particularly in conjunction with its use as a pressure gauge for indicating pressure relations existent at a point remote from the gauge itself, it being understood, however, that it can be used for other purposes.

Referring specifically to Fig. 4, the synchro-transmitter or synchro-generator 20 may have three stator windings 21, 22, and 23. Rotor winding 24 is diagrammatically indicated as being connected by a shaft or means 25 to a pressure responsive means or other operating mechanism. The rotor winding 24 can be connected, with a suitable alternating current source, for example, a source of 26 volts with a frequency of 400 cycles per second, the voltage and frequency being chosen as desired. Synchro-transformer 27 may have conventional stator windings 28, 29, and 30 respectively connected to windings 21, 22, and 23 of the transmitter. If the rotor winding 31 of the synchro-transformer is not positionally located correctly relative to the rotor winding 24 of the transmitter, a signal will appear across the winding 31 which is connected by leads 32 to amplifier 33. The amplifier then will produce an amplified signal in the control phase winding 34 of the two phase servo-motor 35, the amplifier preferably being arranged as described hereafter so that the output signal will be substantially 90° out of phase with the alternating current in winding 36 of the control motor 35, the winding 36 of the control motor 35 preferably being supplied from the same source as the rotor winding 24 of the synchro-transmitter 20. Rotor 37 of the servo-motor 35 is mechanically connected to rotor winding 31 in a suitable manner as indicated schematically by dot-dash line 38, this connection including a mechanical damping arrangement which is the subject matter of this application.

When there is a change in position of rotor winding 24 because of a change in the function being measured, an error signal will be produced in rotor winding 31 of the synchro-transformer, which will produce a control voltage in the control winding 34 of motor 35. This will cause rotor 37 to turn until the signal again becomes zero. At this point, rotor 31 will be in the same relative position to its stator windings as is rotor 24 relative to its stator windings. The servo-motor 37 can be connected to suitable indicating means as will be described at a later point.

One of the features of the present invention is the arrangement of the parts including the gear train and damping means so that synchro-transformer 27, amplifier 33, and servo-motor 35 can be unitarily assembled in a relatively small casing. Merely by way of example, in one instrument made in accordance with the invention, the casing including the amplifier and servomechanism is only about 4" to 6" long and about 1¾" to 2" in diameter. The instrument casing can be constructed so that it may be mounted on an instrument panel, such as on an airplane panel, or can be used in other manners as desired.

The casing 39 (Fig. 1) may be of suitable metal or material, said casing having a transparent window 40 at the front thereof and a suitable flange 41 for mounting on the instrument panel. The combination servomechanism and amplifier is assembled as a unit and then inserted into casing 39.

Synchro-transformer 27 can be carried by mounting plate 42 which is suitably fastened by means of spacer bolts or elements 43 to the movement plate 44. Any type of clamping means 45 and screws 46 can be employed to hold the synchro-transformer 27 in position on the synchro-transformer mounting plate 42. Servo-motor casing 35 can be mounted on movement plate 44 by means of clamps 47 and clamping screws 47A.

The mechanical connections between the synchro-transformer and the servo-motor include a main gear train from the servo-motor 35 to the synchro-transformer 27. This may be traced from pinion 48 (Fig. 2) attached to the rotor of servo-motor 35, through gear 49, pinion 50, gear 51, pinion 52, and to split gear 53.

Split gear 53 is arranged so that one half 54 of the gear 53 is connected to shaft 55, the other half 56 of the split gear being loosely mounted on shaft 55. A spring arrangement 56A is attached to gear 56, the spring being wound at least once around shaft 55, the turned over spring end passing loosely through aperture 56B, and being attached to gear 54. The spring means tends to rotate gear parts 54 and 56 in opposite directions relative to each other and thus maintain a tight fit of the gear 53 with pinion 52. Because of the arrangement shown, the spring characteristics will not be affected by rotational forces, it being important that for accurate indication, extraneous forces not affect the parts.

Shaft 55 is shown broken in the exploded view of Fig. 2, the shaft passing through aperture 57 of movement plate 44, pinion 58 being mounted on shaft 55.

A second split gear 59 is mounted on the synchro-transformer rotor shaft 62, the gear assembly having two parts 60 and 61 similar to split gear 53, the spring being omitted for clarity.

The gears and pinions in the main gear train just described preferably are accurately made so that there is substantially no back-lash and/or eccentricity in the main gear train connecting the synchro-transformer to the place where the auxiliary gear train is connected to the main gear train. Merely by way of example, the sensitivity of the main gear train for best performance may be about one minute between the synchro-transformer and the connection with the auxiliary gear train. The fine pointer 63 preferably is attached to shaft 64 connected to the main gear train. The gears themselves preferably have low inertia and fine gear teeth, for example, numbers of teeth higher than 100 diametral pitch preferably may be used. As previously mentioned, the main gear train may be relatively loose between the servo-motor and the auxiliary gear train.

An auxiliary or inertia gear train is used for driving the unit pointer 65, the unit pointer 65 being connected to shaft 66 upon which is mounted auxiliary gear 67. Auxiliary gear 67 is driven by pinion 68 on the main gear train shaft 55, the fit between the auxiliary gear 67 and pinion 68 being relatively loose so that there may be a slight movement of pinion 68 before gear 67 is rotated thereby. Merely by way of example, the sensitivity for best performance may be about three minutes between the main gear train and the auxiliary gear train. Thus, the inertia of auxiliary gear 67 and the unit pointer 65 does not affect the initial movement of the control motor as it turns the fine pointer 63 to re-zero the rotor of the synchro-transformer 27.

Changes can be made in the gear ratios so as to obtain the required movement of the pointers or hands and the desired relationship of the fine pointer and unit pointer. A suitable dial 69 (Figs. 1, 2) can be mounted on movement plate 44 by conventional columns or screws 70. The glass 40 can be held in the casing in a conventional manner.

Figures 5 and 6 are fragmentary views wherein parts identical to the previously described arrangement have been given the same numbers. Gear 75 has been added to the servo-motor shaft 62 upon which pinion 48 is mounted. Gear 75 meshes with pinion 78 which in turn drives inertia disc 76. Merely by way of example, the ratio of the pinion 78 to gear 75 can be 1:4 so that weight 76 will turn four times as fast as the servo-motor. The servo-motor can, for example, turn at 7,000 R. P. M. at no load so that the force required to accelerate the pinion shaft and weight 76 at such a high R. P. M. will effectively damp rapid oscillations of the pointer caused by fluctuation in pressure. Yet when a large signal is impressed on the servo-motor for a relatively long period of time, the inertia disc will reach normal speed and except for the frictional drag of the pinion, will not affect operation. As one example, the disc may be .025" thick and ⅜" in diameter.

The auxiliary gear train functions in the same manner as previously described and its inertia will not affect the system at the instant that movement starts.

It is to be understood that variations may be made in the details described herein. For example, the unit pointer need not be used, and the invention can be employed for various instruments. Thus, the means for carrying out the invention can be varied in details without departing from the spirit of the invention except as defined in the appended claims.

What is claimed is:
1. In a positional following device, the combination including a synchro-transformer having a rotor, a servo-motor having a rotor, said servo-motor being electrically connected to said transformer so as to be rotated in accordance with a signal impressed thereon, a gear train mechanically connecting said rotors so as to position said transformer rotor in accordance with said signal, and an inertia gear means meshed with said gear train but not therein, said inertia gear means having a relatively loose fit relative to said gear train, so that said servo-motor initially can start to turn said synchro-transformer rotor free from said inertia gear means but turning said inertia gear means after starting, said inertia gear means after the initial movement of said train adding its inertia thereto.

2. In a positional following device, the combination including a synchro-transformer having a rotor, a servo-motor having a rotor, said servo-motor being electrically connected to said synchro-transformer so as to be rotated in accordance with a signal impressed thereon, a gear train mechanically connecting said rotors so as to position said synchro-transformer rotor in accordance with said signal, an inertia gear means meshed with said gear train but not therein, said inertia gear means having a relatively loose fit with said gear train so that said motor can start to turn said synchro-transformer rotor free from said inertia gear, said main gear train being close fitting between said synchro-transformer and the place where said inertia gear means meshes therewith, said inertia gear means after the initial movement of said train adding its inertia thereto, and indicator means connected to said main gear train.

3. In a damped position following device, a driving rotor and a driven rotor, a gear train connecting said rotors, and a damping gear means externally meshed with said gear train in relatively loose fitting gear tooth relationship so that said system will initially move without the inertia of said damping gear means and which will thereafter include said inertia in damping relationship therewith, said gear train being substantially free from back lash from the driven rotor to the place where said damping gear means meshes with said gear train.

4. In a positional following device, the combination including a synchro-transformer having a rotor, a servo-motor having a rotor, said servo-motor being electrically connected to said synchro-transformer so as to be rotated in accordance with a signal impressed thereon, a main gear train mechanically connecting said rotors so as to position said synchro-transformer rotor in accordance with said signal, said gear train having fit take-up means therein, and an inertia gear meshed with said gear train but not in said train, said inertia gear having a relatively loose fit with said main gear train, so that said servo-motor can initially turn said synchro-transformer rotor free from said inertia gear.

5. In a positional following device, the combination including a synchro-transformer having a rotor, a servo-motor having a rotor, said servo-motor being electrically connected to said synchro-transformer so as to be rotated in accordance with a signal impressed thereon, a gear train mechanically connecting said rotors to position said synchro-transformer rotor in accordance with said signal, at least one split gear in said gear train having its elements urged in opposite directions, and an indicator means connected to said gear train.

6. In a positional following device, the combination including a unitary casing having an amplifier therein, a synchro-transformer therein having a rotor, a servo-motor having a rotor, said servo-motor being electrically connected to said synchro-transformer so as to be rotated in accordance with a signal impressed thereon, a main gear train mechanically connecting said rotors so as to move said synchro-transformer rotor in accordance with said signal, an indicator driven by said main gear train, an inertia gear train meshed with said main gear train intermediate said synchro-transformer and said servo-motor but not directly in said train, said inertia gear having a relatively loose fit with said gear train so that said servo-motor can turn said synchro-transformer rotor without said inertia gear upon initial movement, said main gear train being close fitting between said synchro-transformer and the connection of said inertia gear therewith, said inertia gear after the initial movement of said train adding its inertia thereto, and a second indicator means driven by said auxiliary gear train.

7. In a positional following device, the combination including a synchro-transformer having a rotor, a servo-motor having a rotor, said servo-motor being electrically connected to said synchro-transformer so as to be rotated in accordance with a signal impressed thereon, a gear train mechanically connecting said rotors so as to position said transformer rotor in accordance with said signal, said gear train having at least one gear with two halves with a spring connecting the same tending to rotate the halves in opposite directions, said spring being made of wire and having a portion surrounding the shaft on which the two halves of the gear are mounted, an inertia gear train meshed with said gear train, said inertia gear having a relatively loose fit with said gear train, so that said servo-motor can start to turn said transformer rotor free from said inertia gear, said inertia gear after the initial movement of said train adding its inertia thereto, and indicators connected to each of said gear trains.

8. In a positional following device, the combination comprising movement holding plate means, synchro-transformer and servo-motor means carried by said plate means, a main gear train connecting the rotors of said synchro-transformer and servo-motor, and an auxiliary gear train loosely connected to said main gear train, the sensitivity of said auxiliary gear train where it connects with said main gear train being less than about one-third of the sensitivity of the relatively high sensitivity of a main gear train between the synchro-transformer and the place where said auxiliary gear train is connected thereto.

9. In a positional following device, the combination comprising movement holding plate means, synchro-transformer and servo-motor means carried by said plate means, a main gear train connecting the rotors of said synchro-transformer and servo-motor, an auxiliary gear train loosely connected to said main gear train, the sensitivity of said auxiliary gear train where it is connected to said main gear train being in the range of more than about three minutes, the sensitivity of said main gear train between the synchro-transformer and the place where said auxiliary gear train is connected to said main gear train being in the range of one minute, and indicator means operated by said gear trains.

10. In a positional following device, the combination comprising movement holding plate means, synchro-transformer and servo-motor means carried by said plate means, a main gear train connecting the rotors of said synchro-transformer and servo-motor, said main gear train including lost motion take-up means therein, an auxiliary gear train loosely connected to said main gear train, the sensitivity of said auxiliary gear train where it is connected to said main gear train being less than about one-third the sensitivity of the relatively high sensitivity of the main gear train, the main gear train being relatively loose between said servo-motor and said auxiliary gear train, and indicator means operated by said gear trains.

11. In a positional following device, the combination including a synchro-transformer having a rotor, a servo-motor having a rotor, said servo-motor being electrically connected to said transformer so as to be rotated in accordance with a signal impressed thereon, a gear train mechanically connecting said rotors so as to position said transformer rotor in accordance with said signal, and an inertia gear means meshed with said gear train but not therein, said inertia gear means having a relatively loose fit relative to said gear train, so that said servo-motor can start to turn said synchro-transformer rotor free from said inertia gear means, said inertia gear means after the initial movement of said train adding its inertia thereto, and a second inertia means connected to said servo-motor.

12. In a positional following device, the combination including a synchro-transformer having a rotor, a servo-motor having a rotor, said servo-motor being electrically connected to said transformer so as to be rotated in accordance with a signal impressed thereon, a gear train mechanically connecting said rotors so as to position said transformer rotor in accordance with said signal, and an inertia gear means meshed with said gear train but not therein, said inertia gear means having a relatively loose fit relative to said gear train, so that said servo-motor can start to turn said synchro-transformer rotor free from said inertia gear means, said inertia gear means after the initial movement of said train adding its inertia thereto, said main gear train being close fitting between said synchro-transformer and the place where said inertia gear means is connected thereto, and an inertia disc means connected to said main gear train adjacent the connection of said servo-motor thereto so as to inhibit undesirable oscillations of said servo-motor entering the gear train.

13. In a positional following device, the combination comprising movement holding plate means, synchro-transformer and servo-motor means carried by said plate means, a main gear train connecting the rotors of said synchro-transformer and servo-motor, said main gear train including lost motion take-up means therein, additional inertia damping means connected to said main gear train at said servo-motor, an auxiliary gear train loosely connected to said main gear train, the sensitivity of said auxiliary gear train where it is connected to said main gear train being less than about one-third the sensitivity of the relatively highly sensitive main gear train, and indicator means operated by said gear trains.

References Cited in the file of this patent

UNITED STATES PATENTS

| | | |
|---|---|---|
| 1,711,003 | Uhl | Apr. 30, 1929 |
| 1,965,376 | Hicks | July 3, 1934 |
| 2,042,280 | Stuart | May 26, 1936 |
| 2,272,242 | Frischknecht | Feb. 10, 1942 |
| 2,455,618 | Shepard | Dec. 7, 1948 |